US012066852B2

(12) United States Patent
Horii et al.

(10) Patent No.: US 12,066,852 B2
(45) Date of Patent: Aug. 20, 2024

(54) NEUTRAL RETURN MECHANISM

(71) Applicants: KUBOTA CORPORATION, Osaka (JP); KYB CORPORATION, Tokyo (JP)

(72) Inventors: Hiroshi Horii, Sakai (JP); Tetsuya Aoki, Tokyo (JP); Hirotaka Kobayashi, Tokyo (JP)

(73) Assignees: KUBOTA CORPORATION, Osaka (JP); KYB CORPORATION, Tokyo (JP)

( * ) Notice: Subject to any disclaimer, the term of this patent is extended or adjusted under 35 U.S.C. 154(b) by 0 days.

(21) Appl. No.: 18/205,190

(22) Filed: Jun. 2, 2023

(65) Prior Publication Data

US 2023/0324944 A1 Oct. 12, 2023

Related U.S. Application Data

(63) Continuation of application No. PCT/JP2021/047462, filed on Dec. 22, 2021.

(30) Foreign Application Priority Data

Jan. 27, 2021 (JP) ................................ 2021-010774

(51) Int. Cl.
*G05G 5/06* (2006.01)
*G05G 5/05* (2006.01)
*E02F 9/20* (2006.01)

(52) U.S. Cl.
CPC ............... *G05G 5/05* (2013.01); *G05G 5/065* (2013.01); *E02F 9/2004* (2013.01); *G05G 2505/00* (2013.01)

(58) Field of Classification Search
CPC ...... G05G 5/05; G05G 5/065; G05G 2505/00; G05G 1/04; G05G 5/06; E02F 9/2004; E02F 3/964
See application file for complete search history.

(56) References Cited

U.S. PATENT DOCUMENTS 4,936,431 A * 6/1990 Shinpo .................... F16H 59/10 137/75
5,031,737 A * 7/1991 Dzioba .................. F16H 61/22 192/220.2

(Continued)

FOREIGN PATENT DOCUMENTS

JP 49-47159 Y1 12/1974
JP 59-7977 U1 1/1984

(Continued)

OTHER PUBLICATIONS

Translation of JP 61-85760 U1, Iseki & Co., Ltd., Jun. 5, 1986. (Year: 1986).*

(Continued)

*Primary Examiner* — Vinh Luong
(74) *Attorney, Agent, or Firm* — Greenblum & Bernstein, P.L.C.

(57) ABSTRACT

A neutral return mechanism includes an interlocking shaft to be pushed and pulled in an axial direction in conjunction with a swinging operation of an operation member; a housing member to support the interlocking shaft such that the interlocking shaft is movable in the axial direction and accommodate the interlocking shaft such that one of opposite end portions thereof protrudes; a neutral return spring to return the interlocking shaft from a post-movement position to an initial position, the neutral return spring being accommodated in the housing member such that the neutral return spring extends in the axial direction of the interlocking shaft, wherein the housing member includes a supported portion between a spring accommodation portion in which the neutral return spring is accommodated and a protrusion opening through which the interlocking shaft protrudes, the supported portion being supported at a bracket member.

6 Claims, 7 Drawing Sheets

(56) References Cited

U.S. PATENT DOCUMENTS

| | | | | |
|---|---|---|---|---|
| 6,443,026 | B1 * | 9/2002 | Arakawa | F16H 59/10 74/473.23 |
| 2006/0272441 | A1 * | 12/2006 | Kamei | F16H 61/22 74/473.21 |
| 2013/0298546 | A1 | 11/2013 | Ohkubo et al. | |
| 2015/0020635 | A1 | 1/2015 | Tokuda et al. | |
| 2015/0033897 | A1 * | 2/2015 | Washino | B63H 21/213 74/473.15 |
| 2016/0363953 | A1 | 12/2016 | Tokuda et al. | |
| 2017/0285681 | A1 * | 10/2017 | Nishigori | G05G 5/005 |
| 2021/0071388 | A1 | 3/2021 | Yamazaki et al. | |
| 2023/0313494 | A1 * | 10/2023 | Horii | E02F 9/166 74/484 R |

FOREIGN PATENT DOCUMENTS

| | | | | |
|---|---|---|---|---|
| JP | 61-85760 | U1 | 6/1986 | |
| JP | 2013-238256 | A | 11/2013 | |
| JP | 2015-022642 | A | 2/2015 | |
| WO | 2019039546 | A1 | 2/2019 | |
| WO | WO 2022163294 | A1 * | 8/2022 | E02F 9/20 |

OTHER PUBLICATIONS

Define protrusion, Microsoft Bing, May 23, 2024 (Year: 2024).*

Translation of WO 2022/163294 A1, Horii et al., Aug. 4, 2022 (Year: 2022).*

International Search Report issued Feb. 15, 2022 in International application No. PCT/JP2021/047462, with English language translation.

Written Opinion issued Feb. 15, 2022 in International application No. PCT/JP2021/047462, with English language translation.

* cited by examiner

NEUTRAL RETURN MECHANISM

CROSS REFERENCE TO RELATED APPLICATIONS

This application is a continuation application of International Application No. PCT/JP2021/047462, filed on Dec. 22, 2021, which claims the benefit of priority to Japanese Patent Application No. 2021-010774, filed on Jan. 27, 2021. The entire contents of the application are hereby incorporated herein by reference.

BACKGROUND OF THE INVENTION

1. Field of the Invention

The present invention relates to a neutral return mechanism that returns an operation member such as a lever or a pedal to a neutral position.

2. Description of the Related Art

The working machine disclosed in Japanese Unexamined Patent Application Publication No. 2015-22642 has been known in the related art.

The working machine disclosed in Japanese Unexamined Patent Application Publication No. 2015-22642 is provided with an operation member (dozer lever) that is operable to be swung from a neutral position in a first direction and a second direction and that operates a control valve that hydraulically controls a hydraulic actuator.

The operation member operates a pilot valve and, by the pilot valve, operates the control valve that hydraulically controls the hydraulic actuator. A neutral return mechanism that returns the operation member to the neutral position is incorporated in the pilot valve.

SUMMARY OF THE INVENTION

There is a demand for a compact neutral return mechanism that returns an operation member that operates a hydraulic actuator to a neutral position.

Preferred embodiments of the present invention provide compact neutral return mechanisms each of which returns, to a neutral position, an operation member that is operable to be swung from the neutral position in a first direction and a second direction opposite to the first direction and that operates a control valve that hydraulically controls a hydraulic actuator.

A neutral return mechanism according to an aspect of the present invention is a neutral return mechanism to return, to a neutral position, an operation member to be swung from the neutral position in a first direction and in a second direction opposite to the first direction and to operate a control valve, the control valve being operable to hydraulically control a hydraulic actuator, the neutral return mechanism including: an interlocking shaft to be pushed and pulled in an axial direction in conjunction with a swinging operation of the operation member: a housing member to support the interlocking shaft such that the interlocking shaft is movable in the axial direction and to accommodate the interlocking shaft such that one of opposite end portions of the interlocking shaft protrudes; and a neutral return spring to return the interlocking shaft from a post-movement position to an initial position, the post-movement position being a position to which the interlocking shaft has been moved by operation of the operation member, the initial position being a position in which the interlocking shaft was located before the operation of the operation member, the neutral return spring being accommodated in the housing member such that the neutral return spring extends in the axial direction of the interlocking shaft, wherein the housing member includes a supported portion between a spring accommodation portion in which the neutral return spring is accommodated and a protrusion opening through which the interlocking shaft protrudes, the supported portion being supported at a bracket member.

The interlocking shaft may include a connector pivotably supported at and connected to an interlocking arm that protrudes outward in a radial direction of a rotating shaft, the rotating shaft being operable to rotate about an axis parallel to a direction orthogonal to an axis of the interlocking shaft in conjunction with a swinging movement of the operation member. The supported portion may include a bearing supported at the bracket member such that the bearing is rotatable about an axis parallel to the axis of the rotating shaft.

An axial length of a portion of the interlocking shaft that is in the supported portion may be smaller than a length of the neutral return spring in the axial direction of the interlocking shaft when the interlocking shaft is in the initial position.

The neutral return mechanism may further include a first spring receiving member and a second spring receiving member that are accommodated in the spring accommodation portion such that the first spring receiving member and the second spring receiving member are spaced from each other in the axial direction of the interlocking shaft, the neutral return spring including a coil spring and being interposed between the first spring receiving member and the second spring receiving member. The interlocking shaft may include an end portion included in the other of the opposite end portions of the interlocking shaft. The first spring receiving member may be configured such that a movement of the first spring receiving member in a protruding direction is restricted by the supported portion, the protruding direction being a direction in which the interlocking shaft protrudes from the housing member, and that the first spring receiving member moves together with the interlocking shaft in a retracting direction which is a direction opposite to the protruding direction. The second spring receiving member may be configured such that a movement of the second spring receiving member in the retracting direction is restricted by a portion of or on the housing member, and that the second spring receiving member moves together with the end portion in the protruding direction.

The neural return mechanism may further include a detent mechanism to hold the interlocking shaft in an operated position outside a range of a stroke of the interlocking shaft, the range being a range in which the interlocking shaft is automatically returned by the neutral return spring from the post-movement position to the initial position, the post-movement position being a position to which the interlocking shaft has been moved by operation of the operation member, the initial position being a position in which the interlocking shaft was located before the operation of the operation member.

The detent mechanism may include a detent ball, a pressing ball, and a biasing member that are accommodated in an end portion included in the other of the opposite end portions of the interlocking shaft. The detent ball may be movable in a radial direction of the interlocking shaft and configured to hold, outside the range of the stroke, the interlocking shaft in an operated position by protruding outward in the radial direction of the interlocking shaft from the end portion and engaging with an engagement recess in the spring accommodation portion. The pressing ball may be configured to press the detent ball outwardly in the radial direction of the interlocking shaft by a biasing force of the biasing member.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
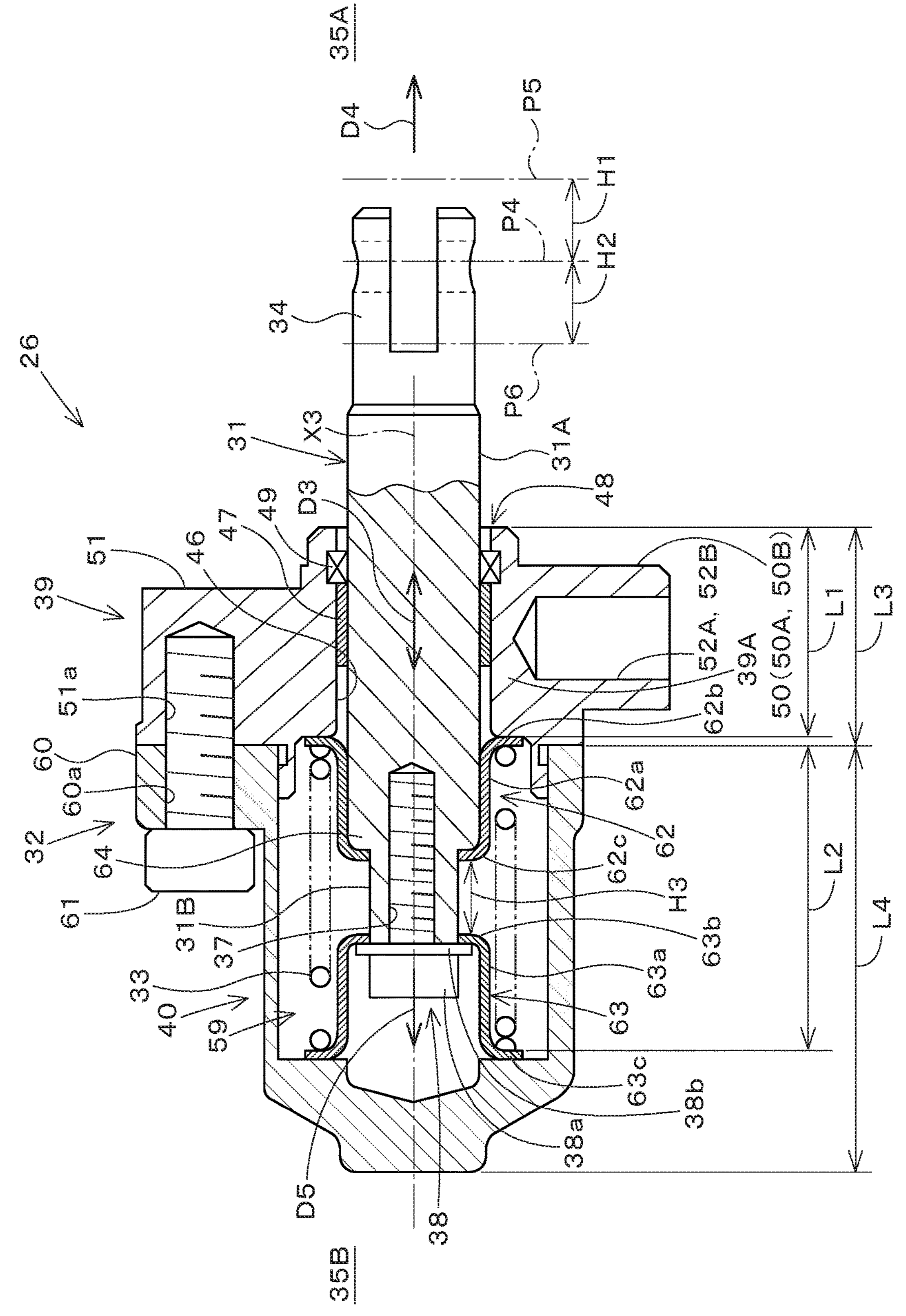
FIG. 1 is a side sectional view of a neutral return mechanism according to a first embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment of the present invention will be described with reference to the drawings, as appropriate.

Figure 2:
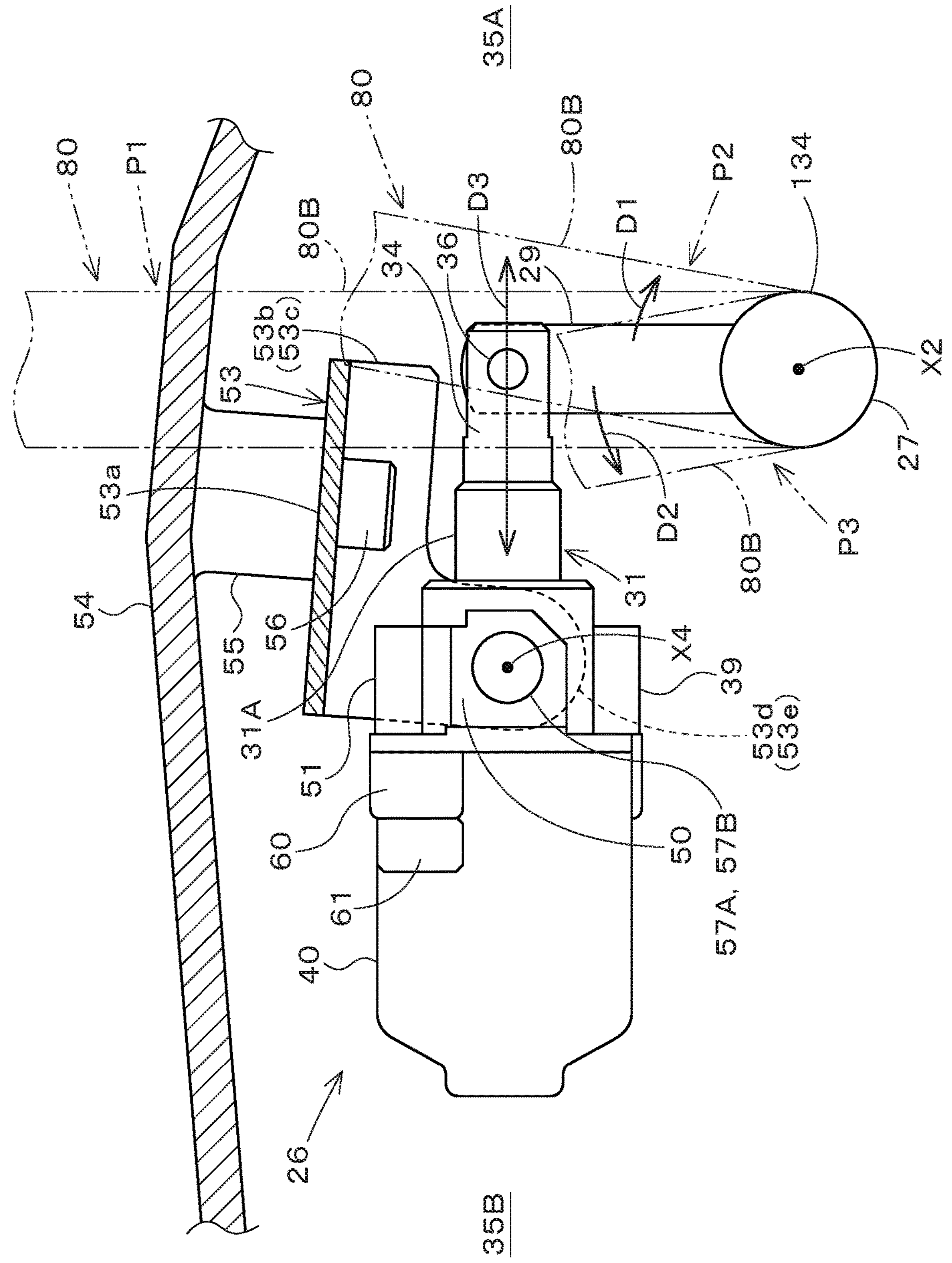
FIG. 2 is a side view illustrating an attached state of the neutral return mechanism according to the first embodiment.
Figure 3:
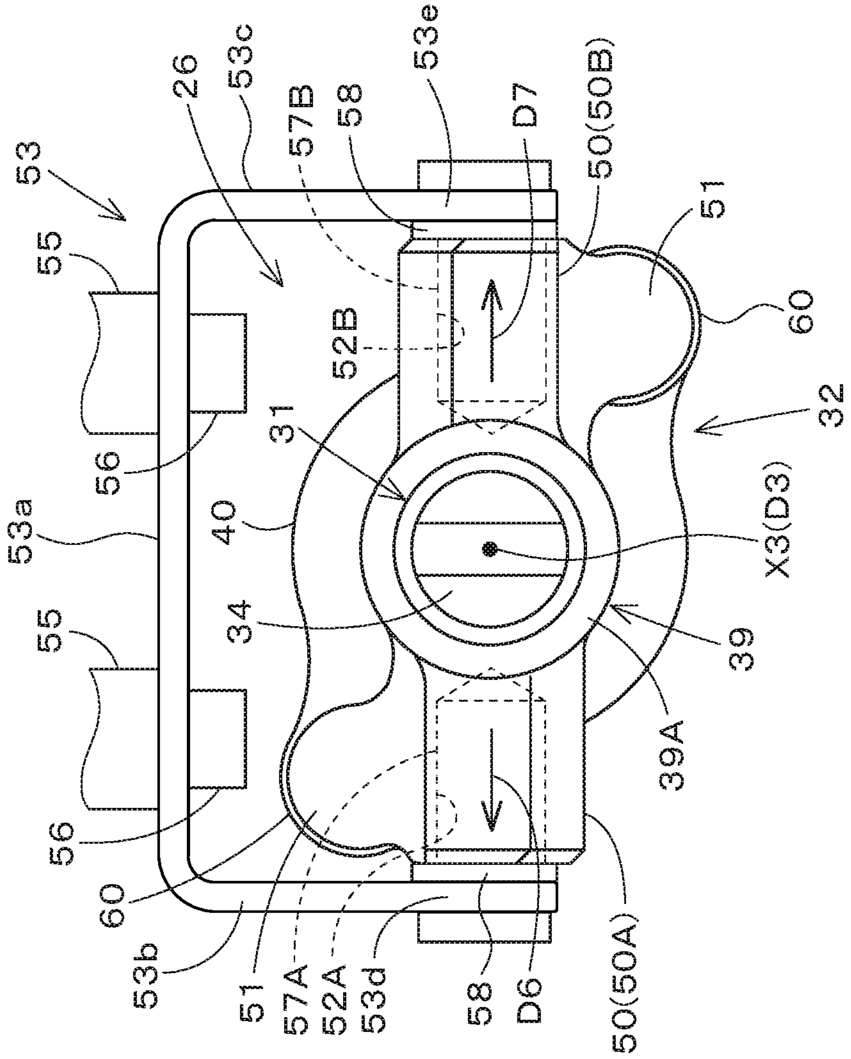
FIG. 3 is a front view illustrating the attached state of the neutral return mechanism according to the first embodiment.
Figure 4:
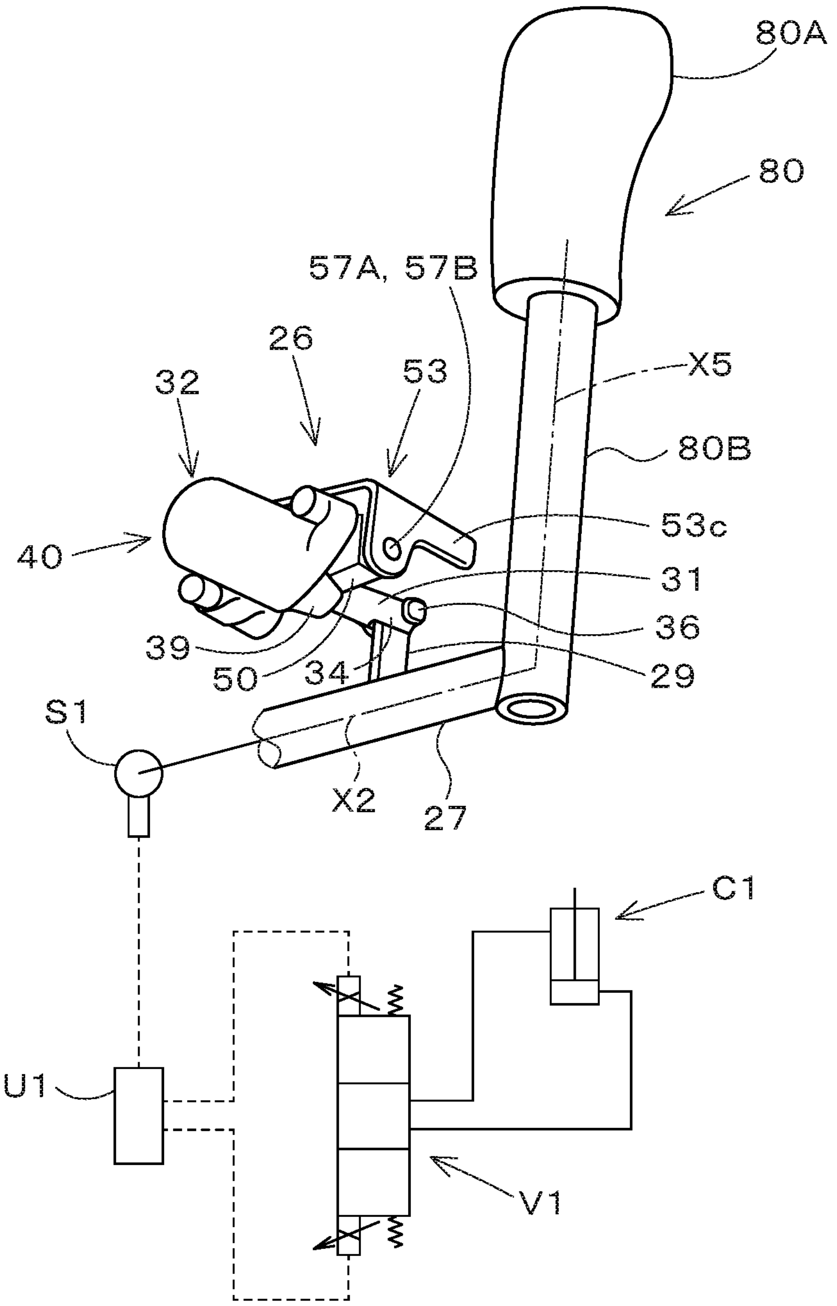
FIG. 4 is a perspective view illustrating a state in which the neutral return mechanism according to the first embodiment is attached.

FIG. 1 to FIG. 4 illustrate a first embodiment of a neutral return mechanism 26. FIG. 1 is a side sectional view of the neutral return mechanism 26, FIG. 2 is a side view illustrating an attached state of the neutral return mechanism 26, FIG. 3 is a front view illustrating the attached state of the neutral return mechanism 26, and FIG. 4 is a perspective view illustrating a state in which the neutral return mechanism 26 is attached to an operation member.

The neutral return mechanism 26 is a mechanism that returns, from an operated position to a neutral position P1, an operation member 80 that is operable to be swung.

As illustrated in FIG. 4, the operation member 80 includes a lever in the present embodiment. The operation member 80 may be a pedal. A lever 80 includes a grip 80A that is to be gripped by an operating person (operator) and a lever shaft 80B having an upper portion to which the grip 80A is attached. One end of a rotating shaft 27 rotatable around an axis (rotation axis) X2 extending in a direction orthogonal to an axis X5 of the lever shaft 80B is fixed to a lower end portion of the lever shaft 80B.

As illustrated in FIG. 2, the rotating shaft 27 is attached by a shaft attaching member, not illustrated, to a wall portion 54 to which the neutral return mechanism 26 is attached, and is supported at the shaft attaching member to be rotatable around the rotation axis X2. An interlocking arm 29 is fixed to the rotating shaft 27. The interlocking arm 29 protrudes outward in the radial direction of the rotating shaft 27 from the rotating shaft 27.

As indicated by the dashed double-dotted lines in FIG. 2, the lever 80 is operable to be swung from the neutral position P1 which is a position in a state in which the lever shaft 80B extends in the up-down direction to a first operated position P2 which is a position of the lever 80 resulting from swing operation about the rotation axis X2 in a first direction D1, and from the neutral position P1 to a second operated position P3 which is a position of the lever 80 resulting from swing operation about the rotation axis X2 in a second direction D2 opposite to the first direction D1.

As illustrated in FIG. 4, an operation direction (swing direction) and an operation amount (swing amount) of the lever 80 are detected by an angle sensor S1. The angle sensor S1 includes, for example, a potentiometer. The angle sensor S1 is connected to a controller U1. The controller U1 can obtain detection information (the operation direction and the operation amount of the lever 80) of the angle sensor S1. Therefore, a detection signal detected by the angle sensor S1 is sent to the controller U1, and, on the basis of the detection signal of the angle sensor S1, the controller U1 electrically controls a control valve (hydraulic solenoid valve) V1 that hydraulically controls a hydraulic cylinder C1 that is an operation object to be operated by the lever 80.

That is, when the lever 80 is operated, the controller U1 controls (or transmits a signal to the control valve V1) electric current that is to be supplied to the control valve V1, and the hydraulic cylinder C1 is operated. Thus, the lever 80 is an operation member that operates the control valve V1 that hydraulically controls the hydraulic cylinder (hydraulic actuator) C1 and is to be used to electrically control the control valve V1 that hydraulically controls the hydraulic cylinder (hydraulic actuator) C1.

As illustrated in FIG. 1 and FIG. 2, the neutral return mechanism 26 includes an interlocking shaft 31, a housing member 32, and a neutral return spring 33. The interlocking shaft 31 includes a bifurcated connector 34 at a first end 35A which is one of opposite ends in an axial direction D3 (also referred to as "first axial end). The connector 34 is pivotably supported at and connected to the interlocking arm 29 by a coupling pin 36. Therefore, when the rotating shaft 27 is rotated by the swinging operation of the lever 80, the interlocking arm 29 swings about the rotation axis X2, and the interlocking shaft 31 is pushed or pulled in the axial direction. In other words, the interlocking shaft 31 is pushed and pulled in the axial direction D3 in conjunction with the swinging operation of the lever (operation member) 80.

As illustrated in FIG. 1, at a second end 35B which is the other of the opposite ends of the interlocking shaft 31 in the axial direction D3 (also referred to as "second axial end"), the interlocking shaft 31 includes a small-diameter portion 31B having a diameter that is smaller than the outer diameter of a shaft body 31A of the interlocking shaft 31. The interlocking shaft 31 has, in its second axial end 35B-side portion, a screw hole 37 extending from the second axial end 35B toward the first axial end 35A (from the small-diameter portion 31B toward the shaft body 31A) in the axial direction D3 of the interlocking shaft 31. The screw hole is a hole including an internal thread formed on the inner surface of the hole. The interlocking shaft 31 includes an end portion 38 included in the second axial end 35B-side portion. The end portion 38 is formed by a bolt and is screwed into the screw hole 37 to be attached to the small-diameter portion 31B and the shaft body 31A. The rotation axis X2 is parallel to a direction orthogonal to an axis X3 of the interlocking shaft 31.

As illustrated in FIG. 1, the housing member 32 supports the interlocking shaft 31 such that the interlocking shaft 31 is movable in the axial direction D3 and accommodates the interlocking shaft 31 such that one of opposite end portions (first axial end 35A-side portion) of the interlocking shaft 31 protrudes. In other words, the housing member 32 supports the interlocking shaft 31 to be movable in a protruding direction D4, which is a direction in which the interlocking shaft 31 protrudes from the housing member 32, and a retracting direction D5, which is a direction opposite the protruding direction D4.

The housing member 32 includes a supported portion 39 located on the same side as the first axial end 35A of the interlocking shaft 31, and a spring accommodation portion 40 located on the same side as the second axial end 35B of the interlocking shaft 31. The supported portion 39 and the spring accommodation portion 40 are formed separately.

The supported portion 39 has a through hole 46 extending in the axial direction D3 of the interlocking shaft. With the shaft body 31A being inserted into the through hole 46, the interlocking shaft 31 is supported at the supported portion 39 with a bushing 47 interposed therebetween, the bushing 47 being fitted to the inner surface of the through hole 46, to be movable in the axial direction D3. An end (first axial end 35A-side end) of the through hole 46 is as a protrusion opening 48 through which the interlocking shaft 31 protrudes. Therefore, the supported portion 39 is provided between the spring accommodation portion 40 and the protrusion opening 48. A dust seal 49 is provided on the same side of the bushing 47 as the protrusion opening 48.

As illustrated in FIG. 1, the supported portion 39 includes a bearing 50 and at least one coupler 51.

As illustrated in FIG. 3, the bearing 50 includes a first bearing 50A and a second bearing 50B that extend integrally from a body 39A of the supported portion 39, which is a portion in which the through hole 46 is formed. The first bearing 50A extends in a direction D6 orthogonal to the axis X3 of the interlocking shaft 31. The first bearing 50A has a first support hole 52A extending from an extending end toward the body 39A. The second bearing 50B extends in a direction D7, which is a direction that is orthogonal to the axis X3 of the interlocking shaft 31 and that is opposite the direction D6 in which the first bearing 50A extends. The second bearing 50B has a second support hole 52B extending from an extending end toward the body 39A. The first support hole 52A and the second support hole 52B have concentric axes that are axes in a direction orthogonal to the axis X3 of the interlocking shaft 31.

As illustrated in FIG. 2 and FIG. 3, the supported portion 39 is pivotably supported at a bracket member 53. The bracket member 53 includes an upper wall 53*a*, a first side wall 53*b* extending downward from one side of the upper wall 53*a*, and a second side wall 53*c* extending downward from the other side of the upper wall 53*a*.

As illustrated in FIG. 2, the upper wall 53*a* is disposed above the supported portion 39 and the first axial end 35A-side portion of the interlocking shaft 31 and is attached by a bolt 56 to a protrusion 55 protruding downward from the wall portion 54 positioned above the bracket member 53. The first side wall 53*b* includes a first pivotably supporting wall 53*d* extending from the upper wall 53*a* on the side of the first bearing 50A and positioned sideward of the first bearing 50A. The first bearing 50A is pivotably supported at this first pivotably supporting wall 53*d* by a first pivotably supporting pin 57A that extends through the first pivotably supporting wall 53*d* to be inserted into the first support hole 52A. The second side wall 53*c* includes a second pivotably supporting wall 53*e* extending from the upper wall 53*a* on the side of the second bearing 50B and positioned sideward of the second bearing 50B. The second bearing 50B is pivotably supported at this second pivotably supporting wall 53*e* by a second pivotably supporting pin 57B that extends through the second pivotably supporting wall 53*e* to be inserted into the second support hole 52B.

As illustrated in FIG. 2, the first pivotably supporting pin 57A and the second pivotably supporting pin 57B have an axis X4 parallel to the rotation axis X2. That is, the supported portion 39 is supported at the bracket member 53 to be rotatable around an axis parallel to the axis (rotation axis X2) of the rotating shaft 27. As illustrated in FIG. 3, the first pivotably supporting pin 57A and the second pivotably supporting pin 57B are locked by a locking member 58.

As illustrated in FIG. 3, the at least one coupler 51 includes a pair of the couplers 51. One of the couplers 51 extends in a direction orthogonal to the axis of the interlocking shaft 31. The other of the couplers 51 extends in a direction that is orthogonal to the axis X3 of the interlocking shaft 31 and that is opposite the direction in which the one of the couplers 51 extends. As illustrated in FIG. 1, each coupler 51 has a screw hole 51*a*.

As illustrated in FIG. 1, the spring accommodation portion 40 has a cylindrical accommodation hole 59 that is concentric with the axis X3 of the interlocking shaft 31. The accommodation hole 59 has a cylindrical shape with one end closed, and is open at the first axial end 35A of the interlocking shaft 31 and is closed at the second axial end 35B of the interlocking shaft 31. The accommodation hole 59 communicates with the through hole 46 of the supported portion 39, and the second axial end-side portion of the interlocking shaft 31 is inserted in the accommodation hole 59.

The spring accommodation portion 40 includes a pair of couplers 60 corresponding to the couplers 51 of the supported portion 39. Each coupler 60 has a screw hole 60*a* extending therethrough. A bolt 61 is screwed into the screw holes 51*a* and 60*a*, and the coupler 51 and the coupler 60 are thereby screw-coupled to each other. Consequently, the supported portion 39 and the spring accommodation portion 40 are coupled to each other.

The neutral return spring 33 is accommodated in the accommodation hole 59 (in the housing member 32). The neutral return spring 33 is formed by a compression coil spring and concentrically accommodated in the accommodation hole 59. In other words, the neutral return spring 33 is accommodated in the housing member 32 such that it extends in the axial direction D3 of the interlocking shaft.

In the accommodation hole 59, a first spring receiving member 62 and a second spring receiving member 63 that receive the load of the neutral return spring 33 are accommodated. The first spring receiving member 62 and the second spring receiving member 63 are accommodated in the spring accommodation portion 40 to be spaced from each other in the axial direction D3 of the interlocking shaft. The neutral return spring 33 is interposed between the first spring receiving member 62 and the second spring receiving member 63.

The first spring receiving member 62 includes a cylindrical portion 62*a* that is disposed radially outward of the shaft body 31A of the interlocking shaft 31, a first portion 62*b* that extends outward in the radial direction from one end of the cylindrical portion 62*a* to be in contact with the supported portion 39, and a second portion 62*c* that extends inward in the radial direction from the other end of the cylindrical portion 62*a* to engage with a step 64 between the shaft body 31A and the small-diameter portion 31B. Consequently, the movement of the first spring receiving member 62 in the protruding direction D4 is restricted by the supported portion 39, and the first spring receiving member 62 moves together with the interlocking shaft 31 in the retracting direction D5.

The second spring receiving member 63 includes a cylindrical portion 63*a* that is disposed outward of a head portion 38*a* of the end portion 38, a first portion 63*b* that extends inward in the radial direction from one end of the cylindrical portion 63*a* to engage with a flange 38*b* of the end portion 38, and a second portion 63*c* that extends outward in the radial direction from the other end of the cylindrical portion 63*a* to be in contact with the spring accommodation portion 40. Consequently, the movement of the second spring receiving member 63 in the retracting direction D5 is restricted by a portion (spring accommodation portion 40) of the housing member 32, and the second spring receiving member 63 moves together with the end portion 38 (interlocking shaft 31) in the protruding direction D4.

In the aforementioned neutral return mechanism 26, as illustrated in FIG. 1 and FIG. 2, when the lever 80 is in the neutral position P1, the interlocking shaft 31 is positioned in an initial position (an initial position of the interlocking shaft 31) P4, which is a position before being operated. In this initial position P4, the interlocking shaft 31 is disposed such that the axis X3 extends horizontally.

When the lever 80 is operated from the neutral position P1 to the first operated position P2, the interlocking shaft 31 moves from the initial position P4 to a first post-movement position (post-movement position) P5, which is a position to which the interlocking shaft 31 has been moved by operation of the lever 80. When the interlocking shaft 31 moves to the first post-movement position P5, the second spring receiving member 63 moves together with the end portion 38 (interlocking shaft 31) in the protruding direction D4 and compresses the neutral return spring 33.

When the lever 80 is operated from the neutral position P1 to the second operated position P3, the interlocking shaft 31 moves from the initial position P4 to a second post-movement position (post-movement position) P6, which is a position to which the interlocking shaft 31 has been moved by operation of the lever 80. When the interlocking shaft 31 moves to the second post-movement position P6, the first spring receiving member 62 moves together with the step 64 (interlocking shaft 31) in the retracting direction D5 and compresses the neutral return spring 33.

As a result of the neutral return spring 33 being compressed, an operation load is applied to the lever 80. The operation load of the lever 80 can be changed by employing (replacing) a neutral return spring 33 having a different load.

When the operation force of the lever 80 is released or the lever 80 is returned to the neutral position P1, the interlocking shaft 31 is returned from the post-movement position (the first post-movement position P5 or the second post-movement position P6) to the initial position P4 by the basing force of the neutral return spring 33.

A stroke H1 between the initial position P4 and the first post-movement position P5 and a stroke H2 between the initial position P4 and the second post-movement position P6 are, for example, set to be substantially the same as a space H3 between the second portion 62*c* and the first portion 63*b* in a state in which the interlocking shaft 31 is in the initial position P4.

In the neutral return mechanism 26 having the aforementioned configuration, as illustrated in FIG. 1, an axial length L1 of the portion of the interlocking shaft 31 that is in the supported portion 39 is smaller than a length L2 of the neutral return spring 33 in the axial direction D3 of the interlocking shaft when the interlocking shaft 31 is in the initial position P4, and the neutral return mechanism 26 is formed to be compact. A length L3 of the supported portion 39 in the axial direction D3 of the interlocking shaft is smaller than a length L4 of the spring accommodation portion 40 in the axial direction D3 of the interlocking shaft.

For example, if a configuration in which a stay member is fixed to a portion of the spring accommodation portion 40 that is on the same side of the interlocking shaft 31 as the second axial end 35B and in which the stay member is pivotably supported at a bracket member attached to the wall portion 54 is employed to pivotably support the housing member 32 on the wall portion 54 side, the size of the neutral return mechanism 26 would increase in the axial direction D3 of the interlocking shaft. In contrast, in the present embodiment, since the supported portion 39 pivotably supported at the bracket member 53 that is attached to the wall portion 54 is provided between the spring accommodation portion 40 and the protrusion opening 48, it is possible to achieve a compact neutral return mechanism 26.

While a structure in which the supported portion 39 is pivotably supported (supported to be rotatable around the axis X4) at the bracket member 53 is employed in the aforementioned embodiment, the supported portion 39 is not limited to this and may be supported in a fixed state (supported not to be rotatable) at the bracket member 53. In this case, for example, a pin insertion hole formed in the interlocking arm 29 and into which the coupling pin 36 is inserted is formed to be an elongated hole so that the interlocking shaft 31 is moved linearly by the movement of the interlocking arm 29 around the rotation axis X2. This is, however, a non-limiting example.

Figure 5:
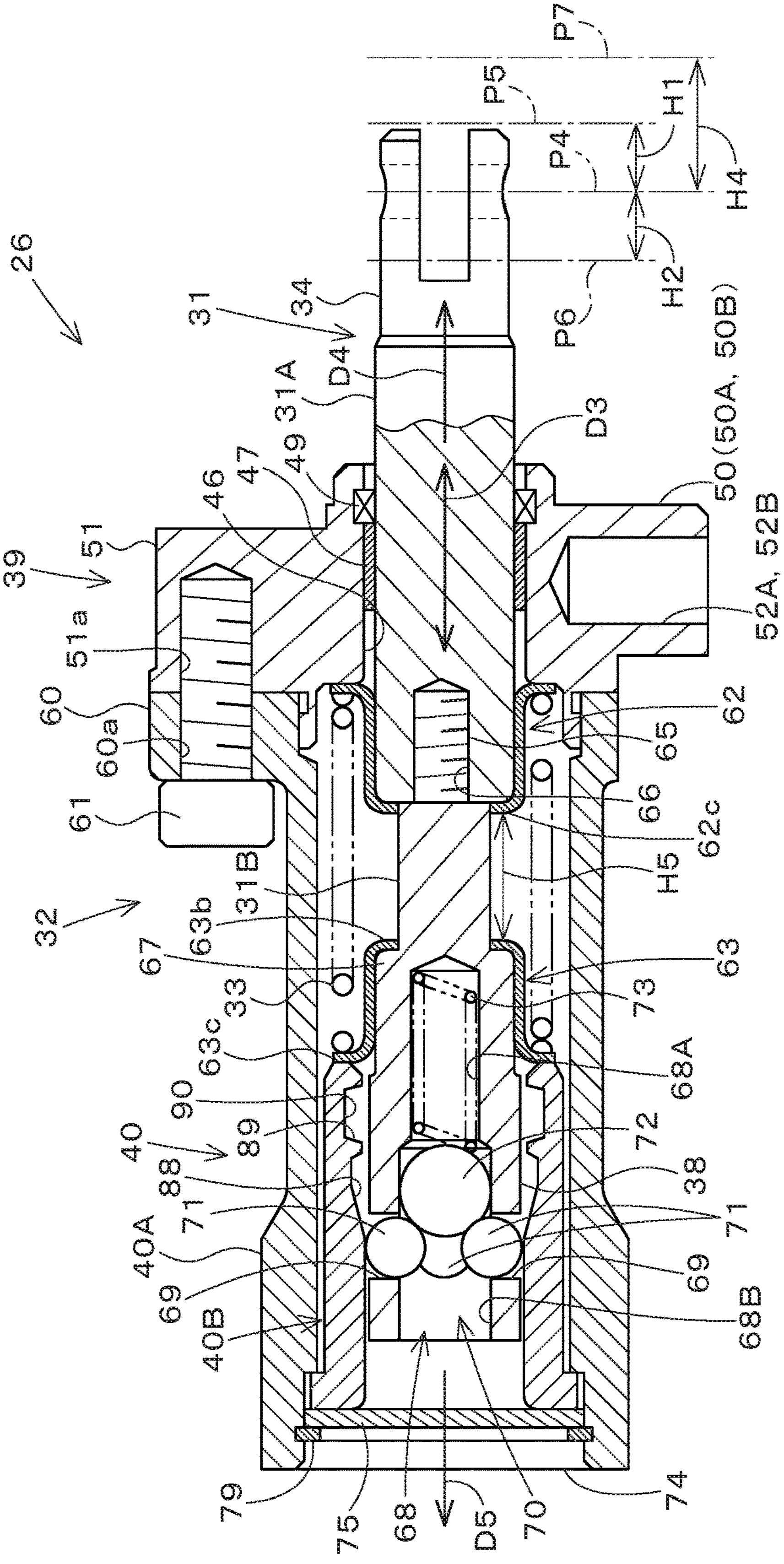
FIG. 5 is a side sectional view of a neutral return mechanism according to a second embodiment.

FIG. 5 illustrates a second embodiment of the neutral return mechanism 26.

In the second embodiment, the end portion 38 and the small-diameter portion 31B are integrally formed, the small-diameter portion 31B is formed separately from the shaft body 31A, a screw shaft portion 65 formed integrally with the small-diameter portion 31B is screwed into a screw hole 66 formed in the shaft body 31A, and the small-diameter portion 31B and the end portion 38 are thereby attached to the shaft body 31A.

The end portion 38 has a columnar shape having an outer diameter larger than the diameter of the small-diameter portion 31B, and the outer diameter of the end portion 38 is substantially the same as the diameter of the shaft body 31A. The first portion 63*b* of the second spring receiving member 63 is engaged with a step 67 between the small-diameter portion 31B and the end portion 38.

An accommodation chamber 68 is formed in the end portion 38. The accommodation chamber 68 is formed by making a hole that extends from the second axial end 35B toward the first axial end 35A of the interlocking shaft 31 in the axial direction D3. The accommodation chamber 68 includes a first accommodation chamber 68A located on the same side as the first axial end 35A of the interlocking shaft 31 and a second accommodation chamber 68B located on the same side as the second axial end 35B of the interlocking shaft 31. The first accommodation chamber 68A is formed by a hole having a diameter smaller than the diameter of the second accommodation chamber 68B.

The end portion 38 includes at least one through portion 69 that is formed to extend from the inner surface of the second accommodation chamber 68B to the outer surface of the end portion 38 in the radial direction.

The accommodation chamber 68 (end portion 38) accommodates a detent mechanism 70. The detent mechanism 70 holds the interlocking shaft 31 in an operated position outside the range of the strokes H1 and H2 of the interlocking shaft 31, the range being a range in which the interlocking shaft 31 is automatically returned from a post-movement position (the first post-movement position P5 or the second post-movement position P6) to the initial position P4 by the neutral return spring 33. The detent mechanism 70 includes at least one detent ball 71, a pressing ball 72, and a biasing member 73.

The detent ball 71 is accommodated in the second accommodation chamber 68B. Specifically, the detent ball 71 is disposed at a position corresponding to the through portion 69 and allows the through portion 69 to move in the radial direction of the end portion 38 (interlocking shaft 31). In the second embodiment, the at least one through portion 69 includes a plurality of (four) through portions 69 formed at equal intervals therebetween in the circumferential direction of the end portion 38. The at least one detent ball 71 also includes a plurality of (four) detent balls 71 corresponding to the four through portions 69.

The pressing ball 72 is disposed between the detent balls 71 and the first accommodation chamber 68A in the second accommodation chamber 68B. The pressing ball 72 has a size that enables the pressing ball 72 to press the four detent balls 71.

The biasing member 73 is formed by a coil spring and accommodated in the first accommodation chamber 68A, and urges the pressing ball 72. The basing force of the biasing member 73 acts in a direction in which the pressing ball 72 presses the detent balls 71. In other words, the pressing ball 72 presses the detent balls 71 outwardly in the radial direction of the interlocking shaft 31 by the basing force of the biasing member 73.

In the second embodiment, the spring accommodation portion 40 includes an accommodation unit body 40A and a sleeve 40B accommodated in the accommodation unit body 40A. The accommodation unit body 40A includes an opening portion 74 facing in the same direction as the second axial end 35B of the interlocking shaft 31. The sleeve 40B is inserted from the opening portion 74 into the accommodation unit body 40A and locked by a spacer 75 and a locking member (snap ring) 79. The second portion 63*c* of the second spring receiving member 63 comes into contact with the sleeve 40B (a portion of or on the housing member 32), thereby restricting the movement in the retracting direction D5.

A tapered portion 88, a positioning protrusion 89, and an engagement recess 90 that are arranged in this order in the direction from the second axial end 35B toward the first axial end 35A of the interlocking shaft 31 are provided radially inward of the sleeve 40B. The tapered portion 88, the positioning protrusion 89, and the engagement recess 90 are located between an intermediate portion of the sleeve 40B in the axial direction and the first axial end 35A of the interlocking shaft 31.

The tapered portion 88 has a tapered shape having a diameter that increases gradually in the direction from the second axial end 35B toward the first axial end 35A of the interlocking shaft 31 (toward the positioning protrusion 89).

The positioning protrusion 89 has a protruding linear shape that protrudes radially inward from the sleeve 40B and that extends in the circumferential direction of the sleeve 40B.

The engagement recess 90 is formed by a circumferential groove formed on the inner periphery of the sleeve 40B in the circumferential direction.

In the second embodiment, as illustrated in FIG. 5, the detent balls 71 are positioned on the same side of the tapered portion 88 as the second axial end 35B of the interlocking shaft 31, when the interlocking shaft 31 is in the initial position P4. When the lever 80 is operated from the neutral position P1 to the first operated position P2 and the interlocking shaft 31 is moved to the first post-movement position P5, the detent balls 71 move from the small diameter portion toward the large diameter portion in the tapered portion 88 while moving outward in the radial direction of the interlocking shaft 31 and come into contact with the positioning protrusion 89.

In a position (when the interlocking shaft 31 is in the first post-movement position P5) in which the detent balls 71 are in contact with the positioning protrusion 89, when the lever 80 is further operated to be swung from the first operated position P2 in the first direction D1, the detent balls 71 climb over the positioning protrusion 89 and are fitted to the engagement recess 90 while the interlocking shaft 31 moves to a detent position P7. When the detent balls 71 are fitted to the engagement recess 90, the interlocking shaft 31 is held in the detent position P7 without being returned to the initial position P4 by the basing force of the neutral return spring 33. In other words, the detent balls 71 can hold, outside the range of the strokes H1 and H2 (which is a range in which the interlocking shaft 31 is automatically returned by the neutral return spring 33 to the initial position P4), the interlocking shaft 31 in an operated position (detent position P7) by protruding outward in the radial direction of the interlocking shaft 31 from the end portion 38 and engaging with the engagement recess 90 in the spring accommodation portion 40.

In the second embodiment, a space H5 between the second portion 62*c* of the first spring receiving member 62 and the first portion 63*b* of the second spring receiving member 63 in a state in which the interlocking shaft 31 is in the initial position P4 is set to be substantially the same as a stroke H4 between the initial position P4 and the detent position P7.

Meanwhile, when the lever 80 is operated to the second operated position P3 and the interlocking shaft 31 is moved to the second post-movement position P6, the detent balls 71 move a cylindrical portion of the inner peripheral surface of the sleeve 40B toward the second axial end 35B of the interlocking shaft 31.

The other configuration of the second embodiment is similar to that in the aforementioned first embodiment, and description thereof is thus omitted.

Figure 6:
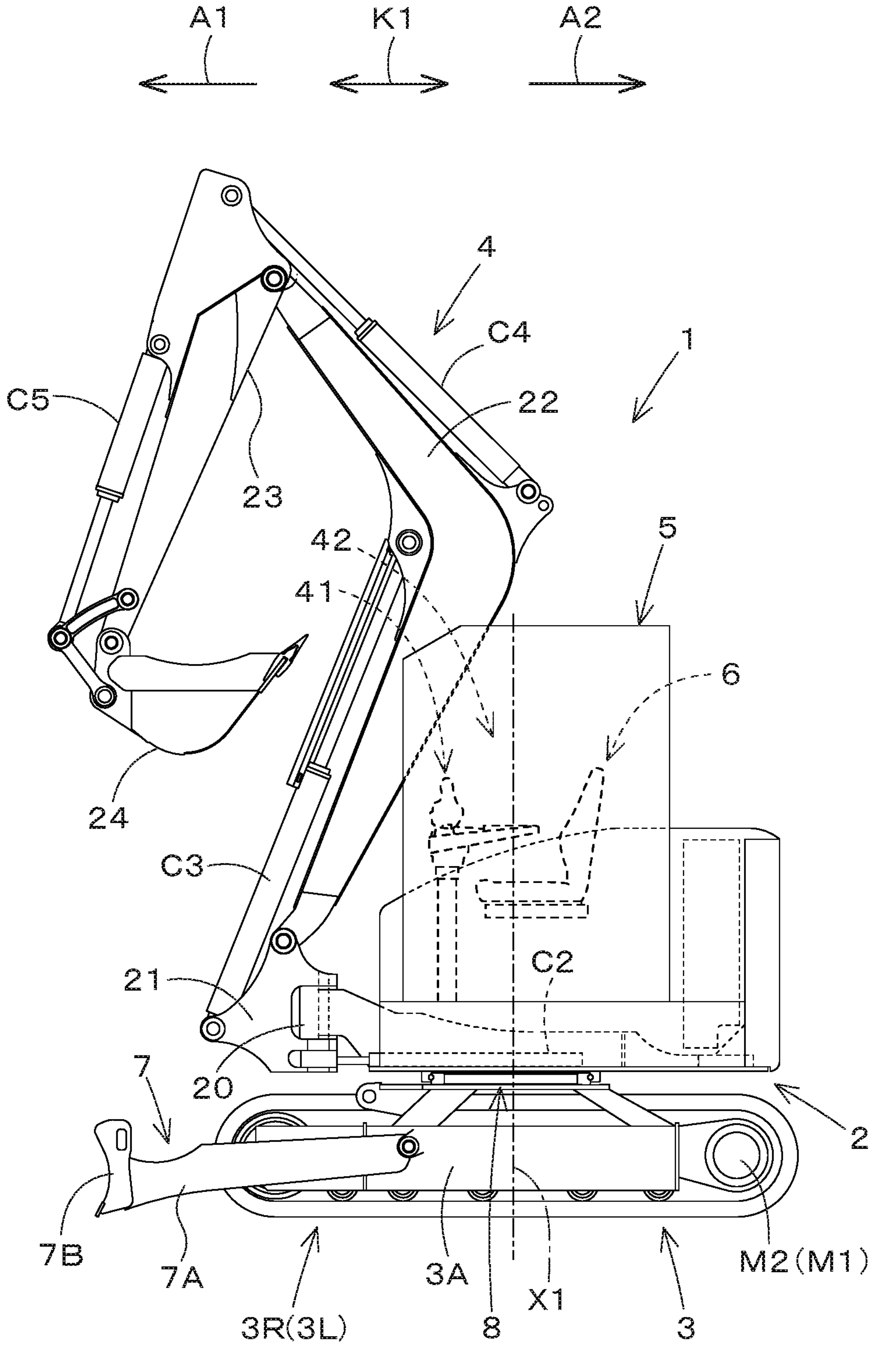
FIG. 6 is a side view of a working machine.
Figure 7:
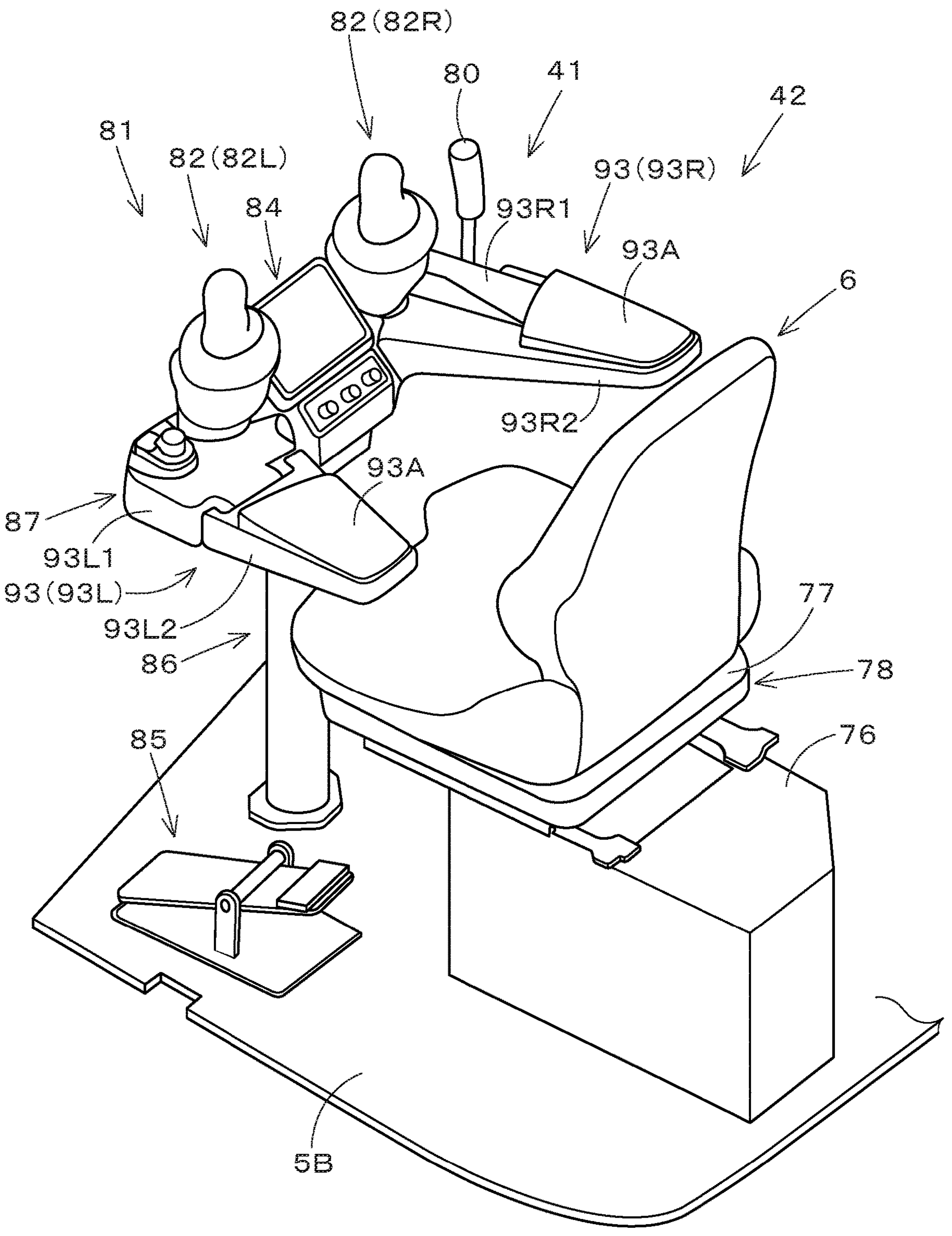
FIG. 7 is a perspective view of an operation unit.

FIG. 6 and FIG. 7 illustrate a working machine 1 in which the neutral return mechanism 26 is employed. FIG. 6 is a schematic plan view illustrating an overall configuration of the working machine 1. FIG. 7 is a perspective view of an operation unit of the working machine 1. In the present embodiment, a backhoe that is a swiveling work machine is presented as an example of the working machine 1.

As illustrated in FIG. 6, the working machine 1 includes a machine body (swivel base) 2, a traveling device 3, and a working device 4. A cabin 5 is mounted on the machine body 2. An operator's seat 6 on which a driver (operator) is to sit is provided in the interior of the cabin 5.

In the present embodiment, a direction (the arrow A1 direction in FIG. 6) toward the front of a driver sitting on the operator's seat 6 of the working machine 1 will be described as forward, a direction (the arrow A2 direction in FIG. 6) toward the rear of the driver will be described as rearward, the arrow K1 direction in FIG. 6 will be described as the front-rear direction, leftward (near side in FIG. 6) of the driver will be described as leftward, and rightward (far side in FIG. 6) of the driver will be described rightward. The horizontal direction, which is a direction orthogonal to the front-rear direction K1, will be described as a machine-body width direction (the width direction of the machine body 2).

As illustrated in FIG. 6, the traveling device 3 includes a travel frame 3A, a first traveling device 3L provided leftward of the travel frame 3A, and a second traveling device 3R provided rightward of the travel frame 3A. The first traveling device 3L is driven by a first traveling motor M1, and the second traveling device 3R is driven by a second traveling motor M2. The first traveling motor M1 and the second traveling motor M2 each include a hydraulic motor (hydraulic actuator).

As illustrated in FIG. 6, a dozer 7 is mounted on a front portion of the traveling device 3. The dozer 7 includes a dozer arm 7A that is swingable in the up-down direction with a rear portion of the dozer arm 7A pivotably supported at the travel frame 3A, and a dozer blade 7B that is provided at a front portion of the dozer arm 7A. It is possible to raise and lower the dozer 7 (raise and lower the dozer blade 7B) by extending and retracting a dozer cylinder (hydraulic actuator).

As illustrated in FIG. 6, the machine body 2 is supported on the travel frame 3A with a swivel bearing 8 interposed therebetween to be able to swivel around a swiveling axis X1. A front portion of the machine body 2 is provided with a support bracket 20, and a swing bracket 21 is supported at the support bracket 20 to be rotatable around a vertical axis (axis extending in the up-down direction).

As illustrated in FIG. 6, the working device 4 includes a boom 22, an arm 23, and a bucket (working tool) 24. A base portion of the boom 22 is pivotally attached to an upper portion of the swing bracket 21 to be rotatable around a lateral axis (axis extending in the machine-body width direction). The arm 23 is pivotally attached to the distal end of the boom 22 to be rotatable around the lateral axis. The bucket 24 is provided at the distal end of the arm 23 to be able to perform shoveling and dumping. Shoveling is an operation of swinging the bucket 24 in a direction toward the boom 22 and is, for example, an operation of scooping earth and sand, or the like. Dumping is an operation of swinging the bucket 24 in a direction away from the boom 22 and is, for example, an operation of dropping (discharging) scooped earth and sand, or the like.

Instead of or in addition to the bucket 24, a different working tool (hydraulic attachment) drivable by a hydraulic actuator can be mounted on the working machine 1. Examples of the different working tool are a hydraulic breaker, a hydraulic crusher, an angle broom, an earth auger, a pallet fork, a sweeper, a mower, a snow blower, and the like.

The swing bracket 21 can be swung by extending and retracting a swing cylinder C2 included in the machine body 2. The boom 22 can be swung by extending and retracting a boom cylinder C3. The arm 23 can be swung by extending and retracting an arm cylinder C4. The bucket 24 can be caused to perform shoveling and dumping by extending and retracting of a bucket cylinder C5. The swing cylinder C2, the boom cylinder C3, the arm cylinder C4, and the bucket cylinder C5 are hydraulic cylinders (hydraulic actuators).

As illustrated in FIG. 6, a manipulator 41 is provided in the interior of the cabin 5. The manipulator 41 is provided forward of the operator's seat 6. An operation unit 42 for operating (manipulating the machine body 2, the traveling device 3, the working device 4, the swing bracket 21, and the like) the working machine 1 includes the operator's seat 6 and the manipulator 41.

As illustrated in FIG. 7, the operator's seat 6 is supported at a floor 5B including the bottom of the cabin 5 with a seat base 76 and the like interposed therebetween. A suspension 77 is provided on the seat base 76, and the operator's seat 6 is provided on the suspension 77 with a slide rail 78 interposed therebetween such that the front-rear position of the operator's seat 6 can be adjusted.

As illustrated in FIG. 7, the manipulator 41 includes a manipulator base 81, a manipulator member 82, a monitor 84, a traveling pedal 85, a lever 80, and the like.

The manipulator base 81 is provided forward of the operator's seat 6 on the machine body 2 and includes a base 86 that stands on the floor 5B (machine body 2) and a manipulator base body 87 that is disposed at an upper portion of the base 86.

The manipulator member 82 is a member that is to be gripped and operated by a driver and is attached to the manipulator base body 87 (manipulator base 81). The manipulator member 82 includes a first manipulation handle 82L and a second manipulation handle 82R that are provided side by side in the machine-body width direction. The first manipulation handle 82L and the second manipulation handle 82R can perform, for example, the swiveling operation of the machine body 2, the swinging operation of a boom 22, the swinging operation of the arm 23, and the swinging operation of the bucket 24.

As illustrated in FIG. 7, the manipulator base body 87 includes armrests 93 provided leftward and rightward of the manipulator base body 87. A first armrest 93L that is the armrest 93 at the left includes an armrest base portion 93L1 and an armrest body 93L2 that is pivotably supported at a rear portion of the armrest base portion 93L1. A second armrest 93R that is the armrest 93 at the right includes an armrest base portion 93R1 and an armrest body 93R2 that is integrally formed with the armrest base portion 93R1. The armrest body 93L2 and the armrest body 93R2 each include, at a rear portion thereof, an elbow rest 93A on which an elbow of the driver is to be placed.

The lever 80 is a dozer lever 80 for manipulating the dozer 7. The dozer lever 80 is operable to be swung forward (in the first direction D1) and rearward (in the second direction D2) from the neutral position P1. The neutral return mechanism 26 in the aforementioned first embodiment and the aforementioned second embodiment is employed to return this dozer lever 80 to the neutral position P1.

The second armrest 93R is formed to be hollow, and the neutral return mechanism 26 and the rotating shaft 27 are accommodated in the inside of the armrest base portion 93R1 of the second armrest 93R. The wall portion 54 to which the neutral return mechanism 26 and the rotating shaft 27 are attached is an upper wall of the second armrest 93R.

The neutral return mechanism 26 can be employed to return the traveling pedal 85 to a neutral position. Further, the neutral return mechanism 26 can be employed to return a swing pedal for performing the swinging operation of the swing bracket 21 to a neutral position. Furthermore, the neutral return mechanism 26 can be employed to return an AUX pedal for operating a hydraulic attachment that is mounted instead of or in addition to the bucket 24 to a neutral position. In addition, the neutral return mechanism 26 may be employed to return the other lever or pedal to a neutral position.

The neutral return mechanism 26 in the second embodiment is employed in a dozer control valve in which a floating position is provided. The floating position is a position in which the dozer blade 7B is lowered by its own weight (free extending/retracting movement of a hydraulic cylinder that moves the dozer arm 7A upward/downward is allowed). In the neutral return mechanism 26 of the second embodiment, the dozer control valve is switched to the floating position by moving the interlocking shaft 31 to the detent position P7. In other words, by holding the interlocking shaft 31 in the detent position P7, it is possible to hold the dozer control valve in the floating position.

A neutral return mechanism 26 according to an embodiment of the present invention is a neutral return mechanism 26 to return, to a neutral position P1, an operation member 80 to be swung from the neutral position P1 in a first direction D1 and in a second direction D2 opposite to the first direction D1 and to operate a control valve V1, the control valve V1 being operable to hydraulically control a hydraulic actuator C1, the neutral return mechanism 26 including: an interlocking shaft 31 to be pushed and pulled in an axial direction D3 in conjunction with a swinging operation of the operation member 80: a housing member 32 to support the interlocking shaft 31 such that the interlocking shaft 31 is movable in the axial direction D3 and to accommodate the interlocking shaft 31 such that one of opposite end portions of the interlocking shaft 31 protrudes; and a neutral return spring 33 to return the interlocking shaft 31 from a post-movement position (first post-movement position P5, second post-movement position P6) to an initial position P4, the post-movement position P5, P6 being a position to which the interlocking shaft 31 has been moved by operation of the operation member 80, the initial position being a position in which the interlocking shaft 31 was located before the operation of the operation member 80, the neutral return spring 33 being accommodated in the housing member 32 such that the neutral return spring 33 extends in the axial direction D3 of the interlocking shaft 31, wherein the housing member 32 includes a supported portion 39 between a spring accommodation portion 40 in which the neutral return spring 33 is accommodated and a protrusion opening 48 through which the interlocking shaft 31 protrudes, the supported portion 39 being supported at a bracket member 53.

With the configuration, the neutral return spring 33 which returns, from the post-movement position P5 or P6 to the initial position P4, the interlocking shaft 31 that is pushed and pulled in the axial direction D3 in conjunction with the swinging operation of the operation member 80 is accommodated in the housing member 32 such that the neutral return spring 33 extends in the axial direction of the interlocking shaft 31, and the housing member 32 is provided, between the spring accommodation portion 40 and the protrusion opening 48 through which the interlocking shaft 31 protrudes, with the supported portion 39 supported at the bracket member 53. This makes it possible to achieve a compact configuration of the neutral return mechanism 26.

The interlocking shaft 31 may include a connector 34 pivotably supported at and connected to an interlocking arm 29 that protrudes outward in a radial direction of a rotating shaft 27, the rotating shaft 27 being operable to rotate about an axis X2 parallel to a direction orthogonal to an axis X3 of the interlocking shaft 31 in conjunction with a swinging movement of the operation member 80. The supported portion 39 may include a bearing 50 supported at the bracket member 53 such that the bearing 50 is rotatable about an axis X4 parallel to the axis of the rotating shaft 27.

The configuration allows the neutral return mechanism 26 to follow the movement of the interlocking arm 29 about the rotating shaft 27.

An axial length L1 of a portion of the interlocking shaft 31 that is in the supported portion 39 may be smaller than a length L2 of the neutral return spring 33 in the axial direction D3 of the interlocking shaft 31 when the interlocking shaft 31 is in the initial position P4.

With the configuration, it is possible to achieve a compact housing member 32 and, in turn, achieve a compact neutral return mechanism 26.

The neutral return mechanism may further include: a first spring receiving member 62 and a second spring receiving member 63 that are accommodated in the spring accommodation portion 40 such that the first spring receiving member 62 and the second spring receiving member 63 are spaced from each other in the axial direction D3 of the interlocking shaft 31, the neutral return spring 33 including a coil spring and being interposed between the first spring receiving member 62 and the second spring receiving member 63. The interlocking shaft 31 may include an end portion 38 included in the other of the opposite end portions of the interlocking shaft 31. The first spring receiving member 62 may be configured such that a movement of the first spring receiving member 62 in a protruding direction D4 is restricted by the supported portion 39, the protruding direction being a direction in which the interlocking shaft 31 protrudes from the housing member 32, and that the first spring receiving member 62 moves together with the interlocking shaft 31 in a retracting direction D5 which is a direction opposite to the protruding direction D4. The second spring receiving member 63 may be configured such that a movement of the second spring receiving member 63 in the retracting direction D5 is restricted by a portion (the spring accommodation portion 40, sleeve 40B) of or on the housing member 32, and that the second spring receiving member 63 moves together with the end portion 38 in the protruding direction D4.

The configuration makes it possible to place the neutral return spring 33 in the spring accommodation portion 40 in a compact manner.

The neutral return mechanism may further include a detent mechanism 70 to hold the interlocking shaft 31 in an operated position (detent position P7) outside a range of a stroke H1, H2 of the interlocking shaft 31, the range being a range in which the interlocking shaft 31 is automatically returned by the neutral return spring 33 from the post-movement position to the initial position P4, the post-movement position being a position to which the interlocking shaft 31 has been moved by operation of the operation member 80, the initial position being a position in which the interlocking shaft was located before the operation of the operation member 80.

The configuration makes it possible to hold the operation member 80 outside the range of the strokes H1 and H2 of the interlocking shaft 31 automatically returned by the neutral return spring 33.

The detent mechanism 70 may include a detent ball 71, a pressing ball 72, and a biasing member 73 that are accommodated in an end portion 38 included in the other of the opposite end portions of the interlocking shaft 31. The detent ball 71 may be movable in a radial direction of the interlocking shaft 31 and configured to hold, outside the range of the stroke H1, H2, the interlocking shaft 31 in an operated position (detent position P7) by protruding outward in the radial direction of the interlocking shaft 31 from the end portion 38 and engaging with an engagement recess 90 in the spring accommodation portion 40. The pressing ball 72 may be configured to press the detent ball 71 outwardly in the radial direction of the interlocking shaft 31 by a biasing force of the biasing member 73.

The configuration achieves a detent mechanism 70 that holds the operation member 80 outside the range of the strokes H1 and H2 of the interlocking shaft 31 automatically returned by the neutral return spring 33.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A neutral return mechanism to return, to a neutral position, an operation member to be swung from the neutral position in a first direction and in a second direction opposite to the first direction and to operate a control valve, the control valve being operable to hydraulically control a hydraulic actuator, the neutral return mechanism comprising:

an interlocking shaft to be pushed and pulled in an axial direction in conjunction with a swinging operation of the operation member, the interlocking shaft having a screw hole extending in the axial direction;

a housing member to support the interlocking shaft such that the interlocking shaft is movable in the axial direction and to accommodate the interlocking shaft such that a first end portion of opposite end portions of the interlocking shaft protrudes;

a second end portion of the interlocking shaft threadedly attached via the screw hole; and a neutral return spring to return the interlocking shaft from a post-movement position to an initial position, the post-movement position being a position to which the interlocking shaft has been moved by operation of the operation member, the initial position being a position in which the interlocking shaft was located before the operation of the operation member, the neutral return spring being accommodated in the housing member such that the neutral return spring extends in the axial direction of the interlocking shaft, wherein the housing member includes a supported portion between a spring accommodation portion in which the neutral return spring is accommodated and a protrusion opening through which the interlocking shaft protrudes, the supported portion being supported at a bracket member.

2. The neutral return mechanism according to claim 1, wherein the interlocking shaft includes a connector pivotably supported at and connected to an interlocking arm that protrudes outward in a radial direction of a rotating shaft, the rotating shaft being operable to rotate about an axis parallel to a direction orthogonal to an axis of the interlocking shaft in conjunction with a swinging movement of the operation member, and the supported portion includes a bearing supported at the bracket member such that the bearing is rotatable about an axis parallel to the axis of the rotating shaft.

3. The neutral return mechanism according to claim 1, wherein an axial length of a portion of the interlocking shaft that is in the supported portion is smaller than a length of the neutral return spring in the axial direction of the interlocking shaft when the interlocking shaft is in the initial position.

4. The neutral return mechanism according to claim 1, further comprising:

a first spring receiving member and a second spring receiving member that are accommodated in the spring accommodation portion such that the first spring receiving member and the second spring receiving member are spaced from each other in the axial direction of the interlocking shaft, the neutral return spring including a coil spring and being interposed between the first spring receiving member and the second spring receiving member, wherein the first spring receiving member is configured such that a movement of the first spring receiving member in a protruding direction is restricted by the supported portion, the protruding direction being a direction in which the interlocking shaft protrudes from the housing member, and that the first spring receiving member moves together with the interlocking shaft in a retracting direction which is a direction opposite to the protruding direction, and the second spring receiving member is configured such that a movement of the second spring receiving member in the retracting direction is restricted by a portion of or on the housing member, and that the second spring receiving member moves together with the second end portion in the protruding direction.

5. The neutral return mechanism according to claim 1, further comprising a detent mechanism to hold the interlocking shaft in an operated position outside a range of a stroke of the interlocking shaft, the range being a range in which the interlocking shaft is automatically returned by the neutral return spring from the post-movement position to the initial position, the post-movement position being a position to which the interlocking shaft has been moved by operation of the operation member, the initial position being a position in which the interlocking shaft was located before the operation of the operation member.

6. The neutral return mechanism according to claim 5, wherein the detent mechanism includes a detent ball, a pressing ball, and a biasing member that are accommodated in the second end portion included in the other of the opposite end portions of the interlocking shaft, the detent ball is movable in a radial direction of the interlocking shaft and is configured to hold, outside the range of the stroke, the interlocking shaft in an operated position by protruding outward in the radial direction of the interlocking shaft from the second end portion and engaging with an engagement recess in the spring accommodation portion, and the pressing ball is configured to press the detent ball outwardly in the radial direction of the interlocking shaft by a biasing force of the biasing member.

* * * * *